March 10, 1925.
A. D. FAUSETT
1,529,121
SUPERHEATER FOR AUTOS
Filed Oct. 15, 1921
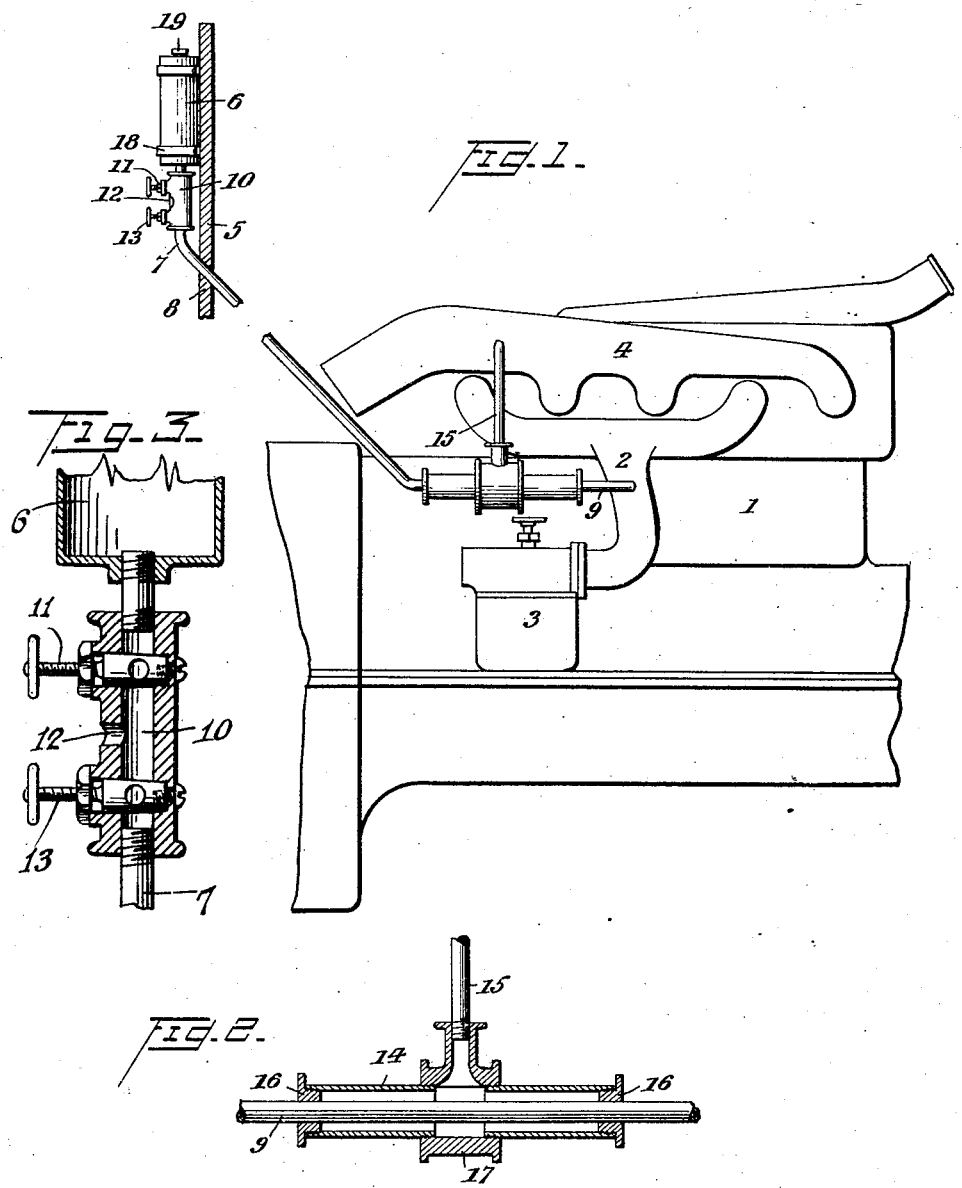
Inventor
Alonzo D. Fausett
By William J. Jacobi
Attorney Patented Mar. 10, 1925.

1,529,121

UNITED STATES PATENT OFFICE.

ALONZO D. FAUSETT, OF WATERLOO, INDIANA.

SUPERHEATER FOR AUTOS.

Application filed October 15, 1921. Serial No. 507,981.

*To all whom it may concern:*

Be it known that I, ALONZO D. FAUSETT, a citizen of the United States, residing at Waterloo, in the county of De Kalb and State of Indiana, have invented certain new and useful Improvements in Superheaters for Autos, of which the following is a specification.

This invention has relation to certain new and useful improvements in a superheater of air and steam mixture for automobiles and has for its primary object the provision of a device of the character stated which may be readily incorporated in any automobile structure of conventional form and will serve to utilize exhaust gases from the engine to heat a liquid such as water and cause vaporizing of the same as it is fed to the intake manifold to pass into the cylinders with the mixture from the carburetor, thereby improving the quality of the mixture as it is fed into the cylinders and permitting a more ready combustion of the mixture.

The invention has for another object the provision of a device of the character stated which will be of extremely simple and inexpensive construction as well as highly efficient in use and composed of the minimum number of parts and in which the amount of water and air to be fed in vapor form to the intake manifold may be readily regulated, as desired.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1 is an elevation of a portion of an engine of conventional type with my invention applied thereto.

Figure 2 is a detail section view on an enlarged scale through a portion of the present device.

Fig. 3 is a transverse vertical section through the sight-feed attachment.

Referring more in detail to the drawings in which similar reference characters designate corresponding parts throughout the several views, 1 indicates in general an engine for a motor vehicle or the like having the usual intake manifold 2 with the carburetor 3 connected thereto and the exhaust manifold 4 from which the exhaust gases are carried from the cylinders of the engine.

In Fig. 1 of the drawings a portion of the usual dash board 5 of the motor vehicle has been indicated so as to show properly positioned thereon the fluid tank 6 for containing water or the like and from which the small tube 7 depends, said tube 7 being extended at an angle and preferably passed through the dash board or other support 5, shown at 8 and finally extended forwardly, shown at 9 and connected with the intake manifold 2, forwardly of the carburetor 3, as shown clearly in Fig. 1 of the drawings. On the straight upper portion of the small tube 7, a double valve casing 10 is mounted and an upper liquid controlling valve 11 is carried in the valve casing 10 at a point above the sight opening and air inlet 12, which latter extends through the casing 10. A second or air controlling valve 13 is carried by the valve casing 10 below the opening 12 so as to regulate the quantity of air entering the tube 7 to mix with the liquid passing from the tank 6.

Enclosing the greater portion of the horizontal forward end of the small tube 7, is the casing 14 having connected therewith the pipe 15 leading from the exhaust manifold 4 so as to employ the heat of exhaust gases to heat the mixture of water and air as it passes through the section 9 of the tube 7 to the intake manifold 2. While the casing 14 may be of any preferred construction, I have shown the same as being composed of a pair of sections of a diameter considerably greater than the exterior diameter of the tube 7 so as to form a chamber around the same. The opposite ends of the casing 14 are shown as being closed by the cap members 16 threaded therein and having closed engagement with the outer face of the tube 7. While the caps 16 are threaded in the ends of the sectional casing 14, the inner ends of these sections are spaced apart and exteriorly threaded so as to receive the central coupling 17, with which the pipe 15, previously mentioned, is connected. This provides for a secured connection between the parts of the casing 14 and the pipe 15 and it will be understood that the flanges on the outer ends of the caps 16 will limit inward movement thereof when securing the same in the ends of the casing 14. While these members may be of any preferred material, it is proposed to make the tube 7 of a metal which may be readily heated, such as copper so as to quickly heat the water and air mixture passing through the tube 7 and vaporize this mixture before it passes into the intake manifold 2 to mix with the combustible mixture from the carburetor 3.

The complete construction and operation of this device should now be readily apparent from the foregoing paragraphs taken in connection with the accompanying drawings without further detailed description. It may be stated at this time, however, that the tank 6, while being shown as supported in clamp members 18, the tank may be secured in position in any suitable and well known manner. It is also to be understood that the tank 6 has a filling opening which is normally closed by a closing cap or plug 19 so that the proper quantity of water or other liquid may be retained within the tank 6.

The object of positioning the tank 6 at a point above the exhaust manifold 4 as well as the other parts of the engine and then extending the tube 7 downwardly on an incline before directing it horizontally through the casing 14 to the intake manifold 4, will be evident to parties familiar with devices of this character, as it may be seen that this will provide for the proper gravity feed of the water and air from the tank 6 and the upper end of the tube 7 while the horizontal forwardly directed portions 9 passing through the casing 14 will give sufficient opportunity for the heated exhaust gases passing into the casing 14 by way of the pipe 15 to thoroughly heat the mixture passing through the portion 9 of the tube 7 to the intake manifold 2.

While the preferred embodiment of the invention has been shown and described, it will be evident that minor changes in the details of construction and arrangement of parts may be resorted to within the scope of what is claimed without departing from the spirit of the invention.

What is claimed is:—

In a superheater adaptable for combined attachment to the exhaust and intake manifolds of an internal combustion engine comprising a conduit pipe of relatively small diameter, a tubular casing surrounding the same in spaced relation thereto formed of a pair of longitudinally spaced apart and aligning sections, the outer ends of said sections being internally threaded and the inner opposed ends thereof being externally threaded, a cylindrical coupling internally threaded and engaged at its ends respectively with the externally threaded inner ends of said sections, a nipple formed on said coupling, means engaged with said nipple for supplying heated air to the coupling and sections of the casing, and a pair of cap members provided with central openings snugly fitting the aforesaid conduit pipe, said cap members having inner reduced and externally threaded portions formed thereon engaged with the internally threaded ends of the sections of said casing, the shoulders formed by the reduced portions of said cap members abutting the peripheral edges of said sections and projecting laterally beyond the outer surface of said casing.

In testimony whereof I affix my signature.

ALONZO D. FAUSETT.